United States Patent [19]

Lutz

[11] Patent Number: 4,588,125
[45] Date of Patent: May 13, 1986

[54] LIQUID SURFACE HEATING SYSTEM FOR FLOORS

[76] Inventor: Hans Lutz, Berggasse 122, 7410 Reutlingen 1, Fed. Rep. of Germany

[21] Appl. No.: 568,800

[22] Filed: Jan. 6, 1984

[30] Foreign Application Priority Data

Jan. 11, 1983 [DE] Fed. Rep. of Germany ....... 3300607

[51] Int. Cl.⁴ .............................................. F24D 3/14
[52] U.S. Cl. ...................................... 237/69; 165/49; 165/53
[58] Field of Search ........................... 237/69, 8 R, 43; 165/49, 53, 67, 170, 171, 168

[56] References Cited

U.S. PATENT DOCUMENTS 4,338,994  7/1982  Hewing et al. ........................ 237/69

FOREIGN PATENT DOCUMENTS 2552305  11/1975  Fed. Rep. of Germany ........ 165/53
2535522   2/1977  Fed. Rep. of Germany ........ 165/49
2248228  12/1980  Fed. Rep. of Germany .
2302485   9/1976  France ................................ 165/53

Primary Examiner—Henry Bennett
Attorney, Agent, or Firm—Michael J. Striker

[57] ABSTRACT

A liquid surface-heating arrangement for heating floors is comprised of a plurality of heating tubes arranged and secured in relatively wide longitudinal passages formed as recesses in heat-isolating elements which form the primary layer of the floor. The heating tubes are arranged in the longitudinal passages so that they do not project upwardly from the upper surface of the heat-isolating elements and upon the application of the floor finish onto the floor primary layer all the channels receiving the tubes are entirely filled with the finish.

6 Claims, 2 Drawing Figures

U.S. Patent  May 13, 1986  4,588,125
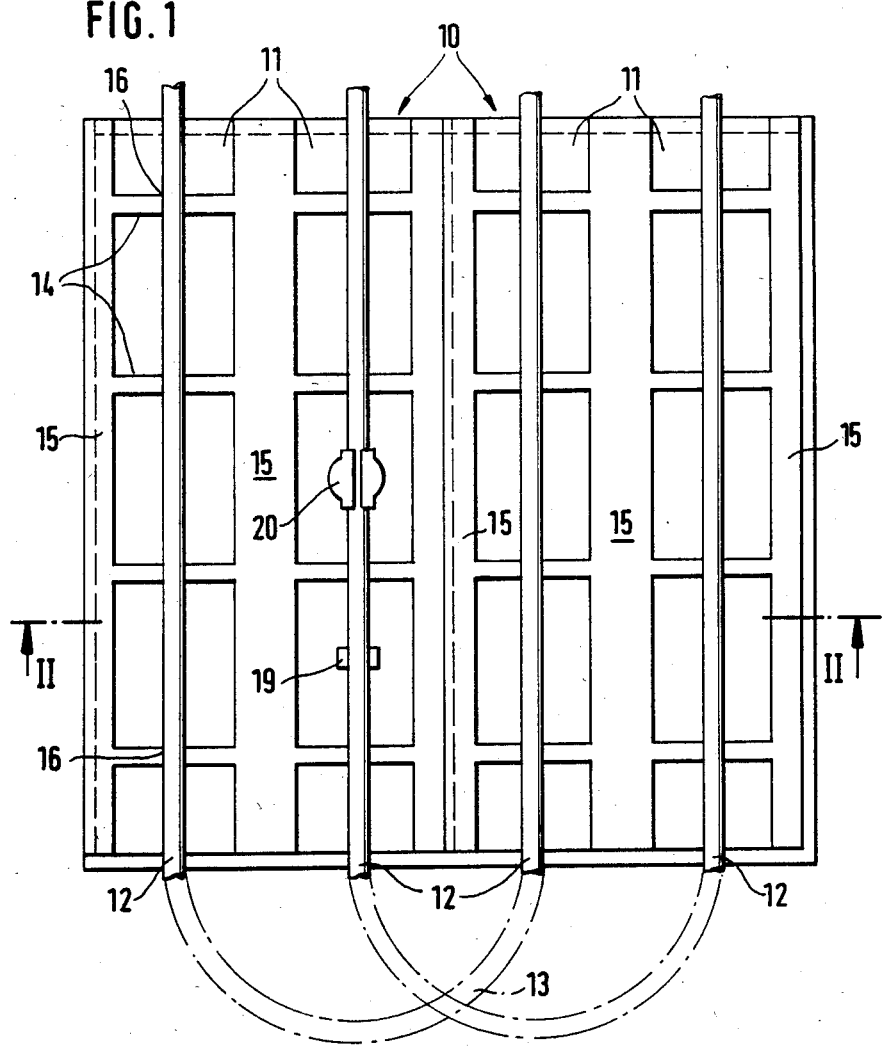
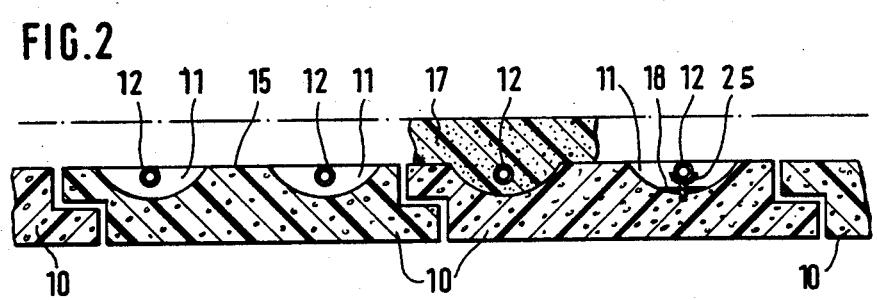

LIQUID SURFACE HEATING SYSTEM FOR FLOORS

BACKGROUND OF THE INVENTION

The present invention relates to a liquid surface heating arrangement for heating the floors, which arrangement includes a plurality of tubes laid in primary layer of the floor in a meander-shaped or bifilar manner and disposed in passages formed in prefabricated elements of heat-isolating material, which form that primary layer.

A liquid surface heating arrangement of the type under consideration is disclosed in applicant's German patent No. 2,248,228. With this known arrangement heat is transmitted to the floor from heating tubes via a heat-conducting metal sheet onto which a floor finish is additionally applied. The known constructions are, however highly expensive and it has been desired to reduce costs of floor heating.

It has been suggested to lay heating tubes of synthetic plastic immediately into the floor finish, without heat-conducting metal sheet. This, however, caused considerable problems during the laying the tubes down and also after the completion of the floor heating.

It has been known that heating tubes are normally arranged in clamping holders formed of various materials, distributed in spaced relationship from each other over the heatisolating primary layer of the floor so that the heating tubes are entirely enclosed with a coating of the floor finish. This, however, means that the heating tubes, after being laid on the primary layer and secured in clamping holders, lie freely over the heat-isolating layer which must be used as a walkway by workers. It has been therefore inevitable that the installed heating tubes would be displaced to the side or bent or shifted from the clamps by workers with the result that the required uniform spacing between the heating tubes would no longer be maintained and this would effect the temperatures in the floor finish layer. Cracks can be formed in the finish layer in a short period of time, which cracks would extend from the upper surface of the finish layer up to the heating tubes. Because of the danger of the formation of cracks in the finish layer due to heat fluctuations which may occur in the heating tubes the middle thickness of the finish layer above the heating tubes must be about 45 mm (according to the instructions of Central Federation of the German Building Trade Committee). If the heating tubes can be forcefully lifted from the floor primary layer this means that the finish layer must have the thickness which is greater than that of the usually utilized floor finish. The finish layer with an additional mass however, makes the floor layer usually worse in regard to desired heat transmission from the heating tubes to the upper side of the floor.

SUMMARY OF THE INVENTION

It is an object of the present invention to provide an improved floor-heating system.

It is another object of the present invention to provide a floor-heating arrangement which would avoid the abovenoted disadvantages of conventional liquid-surface heating systems for floors. To avoid those disadvantages the heating system is so formed that the heat-conducting sheet element acting as a heat-transmission-aid can be omitted without, however, requiring that the mass of the usually utilized floor finish be substantially increased.

These and other objects of the invention are attained by a liquid-surface-heating system for heating floors, including a primary layer having a plurality of elements of heat-isolating material and a finish layer, the system comprising a plurality of heating tubes disposed in the floor in a bifilar or meanderlike manner, said elements having upper surfaces and including a plurality of elongated passages formed by depressions, said depressions having bottom surfaces; and holding means for holding said heating tubes in said depressions beneath said upper surfaces but at a predetermined distance from the bottom surfaces of said depressions so that when the finsih layer is applied onto said primary layer the mass of the finish layer surrounds said heating tubes at all sides thereof.

In the liquid-surface-heating system according to the invention, the heating tubes are immersed in the heat-insulating floor primary layer so that a worker can pass by the tubes, without a danger that the layer will be shifted from the tubes and the tubes will be lifted up or bent up beyond the upper surface of this heat-insulating floor primary layer. Due to a substantial width of the depressions in which the tubes are immersed it is warranted that the finish mass would surround the tubes at all sides thereof and no undesired webs or edge formations in the finish material would be produced, along which the finish layer could rupture. The finish layer therefore can have a relatively small thickness and a relatively small mass because it must have a required medium thickness only in the region of depressions above the heating tubes and a very small thickness in the regions between the depressions formed in the heat-insulating elements of the primary layer. The finish coating is somewhat inert in regard to the speed of heat transmission so that the liquid-surface-heating with the heating tubes disposed immediately in the finish layer has good and completely satisfactory heating qualities, which in addition include high heat-conducting property and plasticity of the finish plaster. The relatively flat cross-section of the depressions into which the finish mass is applied ensures that in the use of the liquid-surface heating system no undesired cracks or ruptures would occur in the heating tubes.

According to a further concept of the invention the afore-mentioned holding means may include transverse webs formed on said elements at a predetermined distance from each other and provided with slots which receive said heating tubes which are clamped in said slots.

The holding means may include clamping holders anchored in said elements and clamping said heating tubes at said predetermined distance from the bottom surfaces of said depressions. The clamping holders may be made of metal or synthetic plastic material.

Furthermore, the holding means may include additional supporting members supporting said tubes from beneath, the supporting members being arranged in passages formed in the adjoining elements of the primary layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a plan view of two prefabricated and partially overlapping heat-isolating elements which form a floor primary layer, with heating tubes of a liquid surface heating arrangement, inserted therein; and FIG. 2 is a sectional view along line 11—11 of FIG. 1.

DETAILED DESCRIPTION OF THE PREFERRED EMBODIMENTS

Referring now to the drawings in detail, FIG. 1 illustrates two plate-shaped elements 10 made out of foamed synthetic plastic material, which, together with further adjoining similar elements, form a heat-isolating primary layer provided with a liquid-surface heating arrangement in the form of tubes 12. The upper side of each element 10 is provided with two or three channels or passages 11 according to an estimated thickness of the heating tubes, in which passages heating tubes 12 are disposed. Tubes 12 are disposed on the floor in the meander-shaped or bifilar manner, preferably corresponding to that disclosed in German Pat. No. 2,248,228. Two connection elbows 13, shown by broken lines are provided between two sections of the heating tubes, laid on the floor.

Channels 11 are formed as depressions which are spaced from each other in the direction of elongation of the floor by transverse cross-pieces or webs 14. Webs 14 together with elongated cross-pieces or webs 15 formed between the depression-formed channels 11 constitute an upper limiting plane of elements 10. Slots 16 are provided in transverse webs 14, in which heating tubes 12 are clamped at the distance from the bottoms of depressions 11 as shown in FIG. 2.

A finish layer 17 is additionally applied onto the floor. Layer 17 is shown in FIG. 2 in the region of one of longitudinal channels 11 interrupted by webs 14. It is understood that as the respective heating tube 12 is lowered into the depression-formed longitudinal channel 11 this tube is surrounded at all sides thereof with the mass of the finish layer which fills the entire channel area between individual transverse webs 14 of elements 10. This transverse webs 14 form holding means for holding tubes 12 beneath the upper side of elements 10 and above the bottoms of channels 11.

It is of course, understood that the drawing illustrates the floor not on a real scale. If transverse webs 14 shown in FIG. 1 are not of sufficient width they can be replaced by suitable simple distance-holders. Such a distance holder 25 in the form of a metal connection holder is shown in the right-hand longitudinal channel 11. This holder is terminated in a holding fork-like portion for receiving the heating tube 12 and has a collar 18 for providing the depression-formed channel 11 in the floor.

A required spacing of heating tubes 12 from the bottoms of the channels 11 can be obtained, instead of distance-holders 25 by means of simple underlaying supporting elements 19 or by means of clamping elements 20 of metal or synthetic plastic material, held in the elements 10.

The tubes 12 are so arranged in the depressions or recesses 11 that they do not project upwardly from the upper surface of the heat-isolating elements 10.

The width of relatively flat depressions or channels 11 is substantially greater than the diameter of the tubes immersed therein so that the tubes are surrounded by finish layer 17 from all sides thereof.

It will be understood that each of the elements described above, or two or more together, may also find a useful application in other types of liquid-surface-heating systems differing from the types described above.

While the invention has been illustrated and described as embodied in a liquid-surface-heating system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention.

What is claimed as new and desired to be protected by Letters Patent is set forth in the appended claims:

1. A liquid-surface-heating system for heating a floor including a primary layer having a plurality of adjoining elements of heat-isolating material and a finish layer, the system comprising a plurality of heating tubes disposed in the floor in a bifiler or meander-like manner and each having a peripheral surface, said elements having plane upper surfaces and including a plurality of longitudinal webs and a plurality of elongated depressions separated from each other by said longitudinal webs, said depressions each having a concavely curved bottom surface and a width which is much greater than a diameter of said heating tubes and is also greater than the width of each longitudinal web; and holding means for holding said heating tubes in said depressions beneath said upper surfaces but at a predetermined distance from the curved bottom surfaces of said depressions so that when the finish layer is applied onto said primary layer the mass of the finish layer fills said depressions and immediately surrounds the entire peripheral surface of each heating tube.

2. The heating system as defined in claim 1, wherein said holding means include transverse webs formed on said elements at predetermined intervals from each other and provided with slots which receive said heating tubes which are clamped in said slots at said predetermined distance from the curved bottom surfaces.

3. The heating system as defined in claim 2, wherein said supporting members are clamping holders.

4. The heating system as defined in claim 10, wherein said clamping holders are made of metal.

5. The heating system as defined in claim 10, wherein said clamping holders are made of synthetic plastic material.

6. The heating system as defined in claim 2; and further including additional supporting members anchored in said elements at a distance from associated transverse webs and also supporting said heating tubes at said predetermined distance from the bottom surfaces of said depressions.

* * * * *